United States Patent Office 3,146,842
Patented Sept. 1, 1964

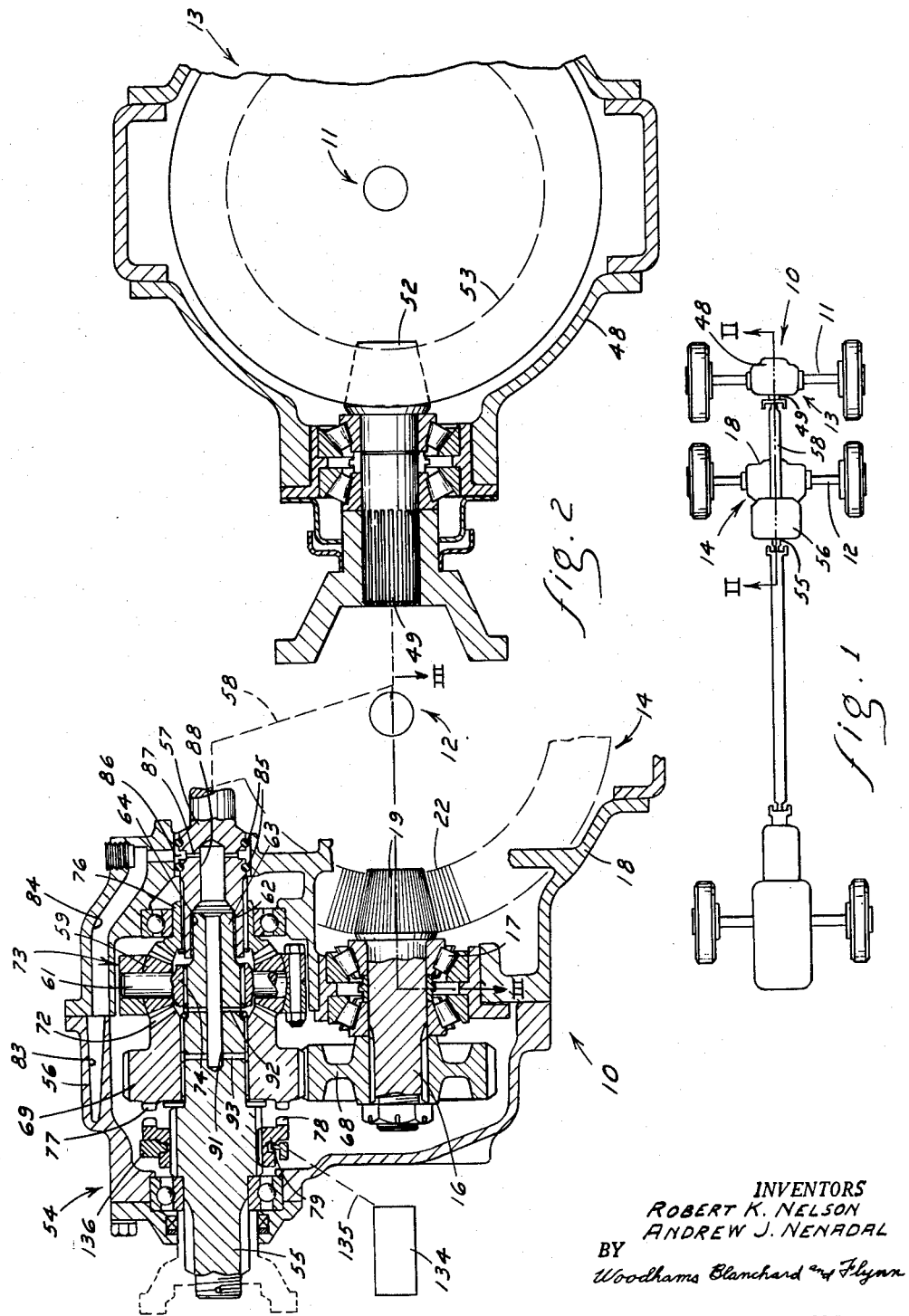

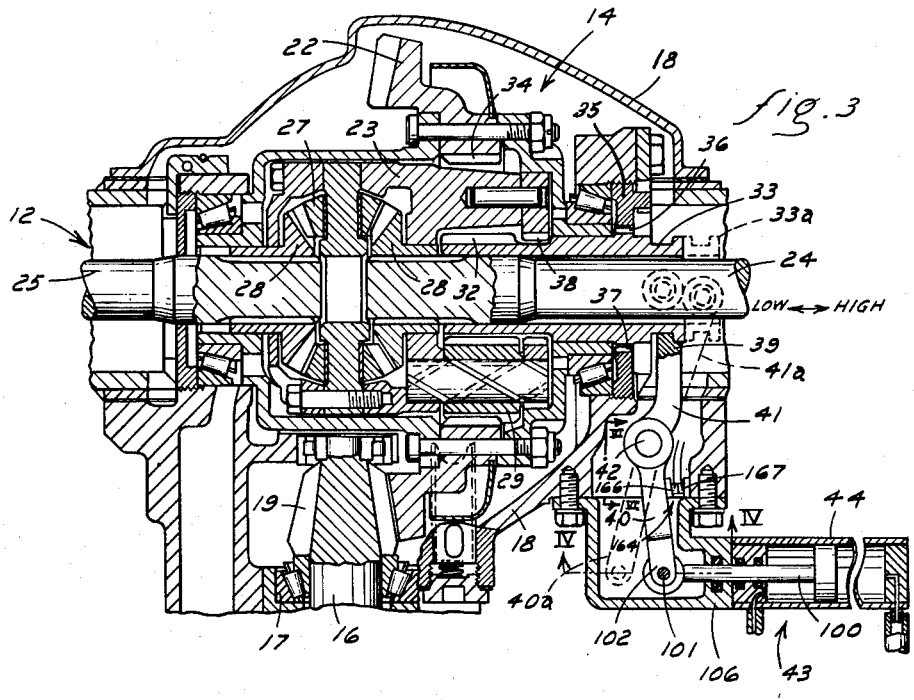

3,146,842
MULTI-SPEED TANDEM DRIVE AXLE
MECHANISM
Robert K. Nelson and Andrew J. Nenadal, Cleveland, Ohio, assignors to Eaton Manufacturing Company, Cleveland, Ohio, a corporation of Ohio
Filed June 1, 1961, Ser. No. 114,104
15 Claims. (Cl. 180—22)

This invention relates in general to multiple-speed axle drives and particularly to tandem arrangements thereof whereby at least three speeds may be selectably obtained.

The prior art has been acquainted with the use of multi-speed axles and it has further been acquainted with the use of two driven axles connected by a differential so that the two axles can be driven at different speed ratios with respect to each other for the purpose of obtaining a net, intermediate speed ratio. However, in a constant effort to improve the reliability and versatility of this type of equipment, the present invention has been developed whereby a pair of multi-speed axles are connected through a differential and in tandem with respect to each other and a control system is provided by which the gearing of said multi-speed axles together with said differential connection may be utilized to drive the vehicle in which said equipment is installed at a selected one of at least three different ratios.

In the developing of such equipment, both control and lubrication problems have presented themselves and hence the present invention also includes features by which these problems are solved and the broad idea of such ratio selection is rendered practicable.

Accordingly the objects of the invention include:

(1) To provide multi-speed axles arranged through differential gearing in tandem with respect to each other, together with control means by which a vehicle equipped with such a system can be driven at a selected one of at least three different speed ratios.

(2) To provide a system, as aforesaid, including apparatus capable of effective and accurate control by a mechanism which will be capable of long and reliable service with a minimum of maintenance.

(3) To provide a system, as aforesaid, which, because it uses substantially standard, multi-speed axle equipment and substantially standard interaxle differentials together with a simple control system, can be provided at only a relatively slight increase in cost over presently known, two-speed tandem axle equipment.

(4) To provide apparatus, as aforesaid, which will be sufficiently similar to presently known, multi-speed axle equipment that it will be capable of effective maintenance by persons presently trained to maintain conventional, multi-speed axle equipment.

(5) To provide apparatus, as aforesaid, which may, if desired, include lock-in means for rendering the interaxle differential ineffective, which lock-in means is used when the vehicle is traversing muddy, slippery or otherwise difficult terrain and which apparatus includes means insuring that both axles are in low gear position when said lock-in means are applied.

(6) To provide apparatus, as aforesaid, including improved and effective lubrication means for the differential mechanism, the same being necessary when the apparatus is operating at an intermediate ratio wherein the interaxle differential mechanism is operating at a high speed.

(7) To provide control mechanism, as aforesaid, which will be applicable to a system for obtaining more than three-speed ratios where axles are used having more than two-speed ratios.

(8) To provide apparatus, as aforesaid, having a failsafe feature wherein upon failure of the control means, the apparatus will automatically return to the low-speed ratio in order that, even if such failure should occur, operation of the vehicle can be continued in the low axle ratio.

Other objects and purposes of the invention will be apparent to persons acquainted with apparatus of this general type upon reading the following disclosure and inspection of the accompanying drawings.

In the drawings:

FIGURE 1 is a top view of the undercarriage of a vehicle embodying the apparatus of the invention.

FIGURE 2 is a broken, sectional view of the portion of the apparatus including the interaxle differential taken along the line II—II in FIGURE 1.

FIGURE 3 is a sectional view of the two-speed differential for the front axle taken along the line III—III in FIGURE 2.

FIGURE 4 is a sectional view taken along the line IV—IV in FIGURE 3.

FIGURE 5 is a diagrammatic view illustrating the control mechanism of the apparatus.

FIGURE 6 is a section taken on the line VI—VI of FIGURE 3.

General Description

In general, the apparatus consists of two tandem connected axles each fitted with multi-speed gear sets connected therein. Suitable interaxle differential mechanism is provided between the respective drive input means to said gear sets. Control means are provided for placing the multi-speed gear sets for said axles in three selected ratio arrangements, namely, (1) with both of said gear sets in low ratio, (2) with one of said gear sets (which may be either one) in high ratio and the other in low ratio and (3) with both of said gear sets in high ratio. In addition, where lock-in means are provided for locking the interaxle differential mechanisms in non-differentiating condition, further control means are provided insuring that both of said gear sets are in low ratio when said lock-in means is activated.

Lubrication means are provided for the differential mechanism in the interaxle differential which responds to the speed of the differential mechanism in order to assure adequate lubrication thereof when same is operating at any speed within the design speed range of the device.

Detailed Description

In connection with the following description, certain terminology will be used for convenience of description, only, and will have no limiting significance. For example, the terms "forward" and "rearward" will refer to directions with respect to the normal direction of movement of the vehicle in which the apparatus of the invention is installed. The terms "inward" and "outward" will refer to directions toward and away, respectively, for the geometric center of said apparatus and parts thereof.

Said terminology will include derivatives of the words above specifically mentioned together with words of similar import.

In order to facilitate an understanding of the apparatus 10 and of the system embodying the invention, the units of which said system is comprised are first explained. The two tandem axles 11 and 12 have multi-speed (here two-speed) multiple gear sets 13 and 14, respectively, each of which includes a differential gear mechanism.

Each of said gear sets may be of any conventional type operable by reciprocable means, such as the two-speed gear set shown in the Carlson Patent No. 2,603,108 or in Russell Patent No. 2,754,692. For convenience in reference, however, a brief disclosure of such a gear set follows.

The forward gear set 14, for example, includes an input shaft 16 which is rotatably supported by the bearings 17 where it extends through the front end of the gear housing 18. The shaft 16 is drivingly connected to a pinion 19, which drives an axle drive gear 22. The planet gear carrier 23 of the differential gear set 14 is mounted upon, and is rotatable with respect to, the adjacent ends of the output shafts 24 and 25. The planet carrier 23 is connected through the bevel gears 27 and 28 to the two output shafts 24 and 25. Said planet carrier supports a plurality of planet gears, one of which appears at 29, which are engaged by the sun gear 32 mounted on the inner end of the sleeve 33. The planet gears 29 also engage the internal teeth 34 on the axle drive gear 22.

When said sleeve 33 is in its leftward (or inward) position, as shown in FIGURE 3, teeth 36 at the rightward end thereof mesh with teeth 37 of a low speed reaction plate 35 which is fixedly mounted in housing 18 and thereby lock said sun gear 32 in a non-rotatable position. Under these circumstances, the axle drive gear 22 operates through said planet gears 29 and the bevel gears 27 and 28 to rotate the shafts 24 and 25 at a reduction drive, or at low speed. When said sleeve 33 is in its rightward position 33a, shown by broken lines in FIGURE 3, then the sun gear 32 engages directly the teeth 38 of the planet carrier 23 and the teeth 36 on the sleeve 33 are disengaged from the teeth 37 on the reaction plate 35. Thus, the sun gear and the planet carrier can rotate together to effect direct (high speed) drive of the differential mechanism by the axle drive gear 22.

The sleeve 33 (FIGURE 3) is engaged by a shift fork 39 for movement from one axial position to the other. The shift fork 39 is mounted on a fork lever 41 which is turn is journaled on a shaft 42. Said shaft is rotatably supported within housing 18. A shift lever 40 is fixed for rotation with shaft 42 and is connected at the other end to a pressure fluid actuated control mechanism 43 (FIGURE 3), including the power cylinder 44, which is discussed hereinafter. An actuating pin 45 (FIGURE 6) is integrally mounted on shaft 42 and cooperates with free end portions of axially spaced torsion springs 46 and 47. Springs 46 and 47 have out-turned end portions 46a and 47a disposed on opposite sides of a lateral arm 39a integral with fork lever 41. When lever 40 is rotated in one direction, pin 45 rotates the free end of spring 47 and torsionally pre-loads lateral arm 39a and conversely, when lever 40 is rotated in the opposite direction, pin 45 rotates the free end of spring 46 and torsionally pre-loads lateral arm 39a. With this arrangement, sleeve 33 is immediately shifted to the selected position when driving torque through the sun gear 32 is interrupted. While driving torque is being transmitted through the sun gear 32, shifting of the sleeve 33 is prevented because of the friction between the teeth of sun gear 32 and the teeth of the planet gear 29.

The rearward gear set 13, which may be substantially the same as the above-described gear set 14, is disposed in a housing 48. The gear set 13 is connected to an input shaft 49 by a pinion 52 which engages an axle drive gear 53. The output shafts (not shown) of axle 11 are connectible to the axle drive gear 53 through a differential gear mechanism which is preferably identical to that discussed above with respect to the gear set 14 wherein the drive gear 22 corresponds to drive gear 53.

The interaxle, differential structure 54, which appears in FIGURE 2, is hereinafter described. The power input shaft 55 is supported in the housing 56 so that it is coaxial with, and is partially piloted in, the first driven or output shaft 57, which is connected by the connecting shaft 58 to the input shaft 49 of the gear set 13 for the rear axle 11. A plurality of bevel gears 59 are rotatably supported upon spaced pins 61 which are rigidly secured to, and extend radially from, a ring 74 splined upon said shaft 55. The ring 74, gears 59 and pins 61 define a differential drive mechanism 73. A suitable anti-friction device, such as a bushing 62, is provided between the pilot 63 of the input shaft 55 and the peripheral wall of the pilot opening 64 in the output shaft 57.

In this embodiment of the invention, the input shaft 16 (FIGURE 2) of the forward gear set 14 also serves as a second driven or output shaft from the differential structure 54. The shaft 16 is supported so that it is spaced from and parallel with said input shaft 55. A gear 68, which is secured upon the shaft 16, is engaged and driven by a gear 69, which is normally rotatably supported upon the input shaft 55. The gear 69 has beveled teeth 72 at the rightward end thereof for engagement with the bevel pinion gears 59 of the differential drive mechanism 73. The bevel pinion gears 59 are also engaged by beveled teeth on the drive gear 76 which is splined upon the output shaft 57. The driven gear 69 carries clutch teeth 77 (FIGURE 2) which are engageable by the teeth 78 of power divider lock clutch member 79, which member is splined upon the input shaft 55 for axial movement with respect to said shaft 55 and for rotation therewith. Said clutch 79 is operated from a power cylinder 134 acting through linkage 135 onto an actuator 136.

Thus, when the clutch teeth 77 and 78 are disengaged, as shown in FIGURE 2, a differential relationship can exist in a known manner between the two driven shafts 57 and 16 as same are driven through the drive mechanism 73 by the input shaft 55. However, when said clutch teeth 77 and 78 are engaged, then the gear 69 is locked to the input shaft 55 and the driven shafts 16 and 57 are driven at a fixed ratio, here 1:1, with respect to each other, such ratio depending upon the relationship between the two gears 68 and 69.

It is important to provide adequate lubrication to the differential gears in the inter-axle differential 54 because the differential is performing a differentiating function whenever the respective axles are operated in different speed ratios.

In order to lubricate properly the differential gearing in the differential structure 54, the parts thereof are provided with a lubrication system including selected passageways therethrough. Specifically, the upper side of the casing 56 (FIGURE 2) surrounding the differential mechanism 73 has a trough 83, one side of which opens tangentially of and adjacent the gear 69 for receiving oil thrown centrifugally thereinto by the gear 69. Said trough extends rearwardly and inwardly (or downwardly) to a passageway 84 which extends through the wall of the casing 54 and is connected to an annular groove 86 in the circumference of the shaft 57. A plurality of radial openings 87 communicate between the groove 86 and a central opening 88 within the driven shaft 57. Axially spaced O-rings 85 prevent leakage of lubricating oil between shaft 57 and the housing and insure that lubricating oil from trough 83 will be transported to central opening 88 through openings 87. Said central opening 88 communicates with the pilot opening 64 in shaft 57 and with a central opening 91 within the input shaft 55, which has a plurality of radial openings 92 extending from central opening 91 through the peripherial surface of shaft 55. The radial openings 92 communicate with the space in casing 56 on the left side of the drive mechanism 73 to direct the flow of oil to the gear teeth 72. Rotation of bevel pinions 59 with respect to bevel gear 72 insures that lubrication will be provided between bevel gear 76 and bevel pinion gears 59. Additional radial openings 93 are axially spaced from radial openings 92 and provide a lubricating duct means for the bushing which supports gear 69.

Thus, oil from the bottom of the casing 56 is carried by the gear 68 upwardly to the gear 69 and thence discharged centrifugally into the trough 83. From here, the oil flows by gravity rearwardly and downwardly through the passageway 84, the annular groove 86 and the radial openings 87 into the central opening 88 within the driven shaft 57. Thereafter, the oil travels leftwardly along the bushing 62 between the two shafts and also moves along the opening 91 and thence outwardly through the radial openings 92 and 93 to the differential drive mechanism 73 and the bushing for gear 69, respectively. Thus, lubricant is supplied in adequate amounts, and in amounts varying according to the speed of rotation of the apparatus, to the teeth of the differential gearing, the bushing supporting gear 69 and to the anti-friction means separating the pilot 63 of the input shaft 55 from the supporting surface defining the pilot opening 64 in the output shaft 57.

The pressure fluid responsive cylinder 44 (FIGURE 3) has a piston rod 100 which is pivotally connected by pin 101 to a yoke 102 on the outer end of the lever 40. In this embodiment, the cylinder 44, which is supported upon the housing 18, is connected to a source 103 (FIGURE 5) of pressure fluid, whereby the piston rod 100 is extended from the cylinder 44. Such extension is continuously opposed by the springs 104 which are connected under tension between the extended ends of the pivot pin 101 and the wall 106 of housing 18 upon which the cylinder 44 is mounted. Thus, the springs 104 act through the levers 40 and 41 to urge the sleeve 33 into its solid line position of FIGURE 3 where the gear set 14 is in its low speed ratio. Operation of the piston rod 100 by the cylinder 44 pivots the levers 40 and 41 into their broken line positions 40a and 41a of FIGURES 3, whereby the gear set 14 is shifted into its high speed ratio.

A similar power cylinder 107 (FIGURE 5) is connected in a similar manner to the gear set 13 for the same purposes.

The control system, which is shown schematically in FIGURE 5, includes the source 103 of any convenient fluid under pressure, preferably air, which source is connected by a conduit 111 to a valve 112, which is in turn connected by conduit 113 to the rear axle cylinder 107. The inlet of a valve 114 is connected by the conduit 116 to the conduit 111, and the outlet of valve 114 is connected by conduit 117 to the front axle cylinder 44. The valves 112 and 114 may be substantially identical and of any conventional type.

Each of said valves 112 and 114 (FIGURE 5) is provided with means by which said pressure is utilized for holding same normally closed. For example, the valves 112 and 114 have balls 118 and 119 which are urged by the pressure fluid against the conical seats 121 and 122, respectively. Said valves are also and respectively equipped with pins 123 and 124 which are extendable through the seats 121 and 122 for unseating the balls 118 and 119. The pins 123 and 124 may be operated by solenoids 126 and 127, respectively, for said unseating movement. Resilient means, such as spring 128 and 129, may be used to urge said pins 123 and 124 continuously away from the balls 118 and 119, whereby said valves are normally closed.

The source 103 (FIGURE 5) of pressure fluid is also connected by a conduit 131 to a normally closed valve 132, here a solenoid valve spring biased to a line closing position, which is connected by conduit 133 to pressure fluid responsive means, such as the power cylinder 134 provided for operating the jaw clutch 79.

A manually operable selector switch 137 has an armature 142 which is connected by a conductor 138 to a source 139 of electrical potential, such as a battery. The selector switch 137 has a first contact 141 connectible by the switch armature 142 to the conductor 138 and also connected to the solenoid 126 by the conductor 143. The switch 137 has a second contact 144 engageable by armature 142 and connected to solenoid 127 by conductor 146. The switch armature 142 is capable of engaging either the contact 144 alone or both of the contacts 141 and 144.

The conduit 133 is also connected by conduit 147 (FIGURE 5) to a pressure responsive means, such as a cylinder 148, having a piston 149 and a bleed-hole 150 in said piston. Said piston is in turn mechanically connected to a normally closed switch 151 in the conductor 138. said switch 151 is held in normally closed position by the compressed spring 152, but it is open by the flow of pressure fluid into the cylinder 148, which occurs when the valve 132 is opened.

A conductor 161 connects from the conductor 138 through a manual switch 162 to the conductor 163 which in turn connects to one side of a switch 164. Said switch has contacts 166 and 167 (FIGURES 3 and 5) mounted in any convenient way, such as on the gear set 14 for the front axle 12 and here in association with the lever 40, for closing when the gear set 14 is in its low ratio position and to open when it is in its high ratio position. The other side of said switch 164 is connected by a conductor 168 to one terminal of the solenoid 169 associated with the valve 132 and the other terminal thereof is connected by a conductor 171 to ground.

The switches 162 and 137 are normally and preferably mounted near the operator's position, as upon the dash panel, in the vehicle with which the apparatus of the invention is used.

*Operation*

With said switch armature 142 in the position shown in FIGURE 5, neither of the solenoids is energized and, hence, neither of the pressure cylinders 44 nor 107 associated with the multi-speed gear sets 13 and 14 (FIGURE 2) is energized. Accordingly, each of said multi-speed gear sets is held in its low-speed ratio position by the springs 104 (FIGURE 4) and the ratio of the entire system is equal to the low ratio of the multi-speed gear sets.

When the switch armature 142 (FIGURE 5) is moved into engagement with the contact 144, the solenoid 127 is energized, whereby the valve 114 is opened and the pressure cylinder 44 associated with the front axle 12 is activated. This moves the frontward shift mechanism 14 in the manner above described into its high ratio condition. With the front gear set 14 thusly in its righ ratio condition and with the rear gear set 13 still in its low ratio condition, the differential between these ratios is taken up by the inter-axle differential drive mechanism 73. Thus, the net ratio between the input shaft 55 and the output shafts in the axles 11 and 12 of the vehicle is halfway between the high ratio developed by the front gear set 14 and the low ratio in the rear gear set 13.

For example, if the low-speed ratio is 8.87 and the high-speed ratio is 6.5, then one-half the difference between them is 1.18. If this difference is added to the high-speed ratio (or subtracted from the low-speed ratio) it results in an intermediate speed ratio of 7.68.

By moving the switch armature 142 into contact with both of the contacts 141 and 144, both of said solenoids 126 and 127 are energized. Thus, the valves 112 and 114 respectively associated therewith both are opened against the bias provided by the springs 128 and 129 and, accordingly, the pressure cylinders 107 and 44 associated with the multi-speed gear sets 13 and 14 are both actuated. This shifts both of the gear sets 14 and 13 into their high ratio conditions, which ratio is the same as the ratio existing between the pinion gears 19 and 52 and the axle gears 22 and 53, respectively.

Downshifting is accomplished by reversing the above-described steps.

When the vehicle encounters very muddy or slippery conditions, or where the friction between the wheels and and the ground cannot be relied upon to hold the rotational speed of the axles 11 and 12 substantially equal to each other, then it may be desirable to lock the inter-axle differential mechanism 73 to insure that both of the driven shafts 49 and 16 are driven at equal speeds. For this to take place, both gear sets 13 and 14 must be in the same speed ratio, here their low speed ratio condition inasmuch as such ratio is the one which will normally be used under the conditions indicated.

To accomplish this, assuming the axles are not already in their low ratio position, the operator first actuates the selector switch 137 to the position shown in FIGURE 5 and this returns both gear sets 13 and 14, respectively, to their low gear positions. When the operator is ready to engage the lock-out clutch 79, either immediately upon entering low ratio or at some time subsequent thereto, he closes the switch 162. This acts when, but only when, the front gear set 14 is in its low position to close a circuit through the switch 164 and thereby connect the battery 139 to the valve 132 to open same. This permits the flow of pressure fluid from the source 103 into the conduit 133. The pressure fluid in conduit 133 also flows into conduit 147 and actuates the piston 149 in the cylinder 148, whereby the switch 151 is opened against the contrary urging of the spring 152 for reasons set forth hereinafter.

At the same time, pressure fluid from the conduit 133 will flow into the pressure fluid cylinder 134 and urge the sliding clutch member 79 rightwardly (FIGURE 2) whereby to engage its teeth 78 with the teeth 77 on the gear 69 and thereby lock said gear 69 for rotation with the input shaft 55. This insures rotation of the driven shafts 49 and 16 at equal speeds, assuming that the gears 68 and 69 are of equal diameter, as is normally true, and the desired condition is accomplished. The connecting of the switch 164 in series with the solenoid 169 insures that the gear set 14 is in low position before the lock clutch cylinder 134 is energized. This, together with the shift fork actuating mechanism particularly shown in FIGURE 6, permits the operator to preselect both the switch 162 and the switch 137 inasmuch as (1) the shift of the cylinder 44 will be absorbed in the springs 45 and 46 and the actual shift of the gear set will be completed only when the necessary synchronous conditions of the gears are met and (2) urging of the clutch 79 into engaged position will occur only after the switch 164 is closed by the front gear set 14 reaching its low position.

With both axles in their low ratio condition and the lock-out clutch 79 engaged, it will be evident that trouble could occur if the operator should move the selector switch 137 into either of its intermediate or high positions releasing the lock-out clutch 79 by opening the switch 162. Therefore, the purpose of the safety switch 151, which is open whenever the valve 132 is open, is to insure that the valves 112 and 114 will not be energized and opened, with the resulting energizing of shift cylinders 44 and 107 regardless of the position of selector switch 137 unless and until the switch 162 has been opened whereby to de-energize the solenoid 139 and close the valve 132. Closing of valve 132, as already above described, results in de-energizing of lock-out clutch cylinder 134 and disengagement of the lock-out clutch 79.

In the foregoing paragraphs, it was assumed for descriptive purposes that the selector switch 137 would be moved first, followed by moving of the lock-out switch 162. It will be evident, and it is one of the advantages of the invention, that the switch 162 may also be moved either before, after, or simultaneously with the switch 137, and either during or after completing of a shift to low ratio inasmuch as the opening of the valve 132 and the consequences flowing therefrom will in any event occur only when the switch 164 is closed.

Further, for convenience in description the foregoing has assumed certain operating and structural features, such as among others the specific switching means shown and the placement of the lock-out clutch 79 for use with the low ratio position of the dual axle system, which have in this embodiment required the placement of the switch 164 for closing when the front gear set 14 occupies its low ratio position. However, it is well within the contemplation and advantages of the invention, and same will be obvious in view of the foregoing, that various conditions may arise which will call for placement of the switch 164 for closing when the rear gear set occupies its low position. One specific example of this latter situation is found in the reversal of the connections to the contacts 141 and 144 whereby to reverse the operative relationship to each other of the gear sets 13 and 14.

Although particular, preferred embodiments of the invention have been disclosed herein for illustrative purposes, it will be understood that modifications or variations of such disclosure, which lie within the scope of the appended claims, are fully contemplated.

What is claimed is:
1. A multiple axle mechanism comprising:
    an input shaft;
    a differential drive mechanism having one input and two output connections, said input connection being connected to said input shaft;
    a first axle and axle driving means including a gear set having at least two speed ratios therein drivingly connecting one output connection of said differential drive mechanism with said first axle;
    a second axle and axle driving means including a gear set having at least two speed ratios therein drivingly connecting the other output connection of said differential drive mechanism with said second axle;
    a first force means acting on each of said gear sets for placing and holding both of said gear sets simultaneously in the first of said two speed ratios;
    second force means individually connected to said gear sets acting oppositely to and in negation of the effect of said first force means for independently shifting each of said gear sets from said first of said two speed ratios to the second of said two speed ratios and for holding each of said gear sets respectively in said second of said speed ratios; and
    operator manipulated control means acting on said second force means for (1) shifting one of said gear sets from the first of said two speed ratios into said second of said speed ratios without shifting the other gear set from said first of said speed ratios and (2) shifting the other of said gear sets into the second of said two speed ratios from said first speed ratio while continuing to hold said one of said gear sets in said second of said two speed ratios.

2. A multiple axle mechanism as set forth in claim 1; said second force means including a power circuit connected to and acting on each gear set for shifting said gear set between said first and said second speed ratios;
    said power circuit including a power source and parallel branches connecting said power source to said gear sets, respectively.

3. A multiple axle mechanism as set forth in claim 2; wherein said power circuit further includes electrically operated means in each of said power circuit branches for controlling the flow of power therethrough; and
    means connecting said control means to said electrically operated means whereby said electrically operated means are operated in response to the manipulation of said control means.

4. A multiple axle mechanism according to claim 2;
said power circuit including fluid pressure operated means for shifting said gear sets;
said branches of said power circuit being connected to said fluid pressure operated means;
valve means in each of said branches; and
means operatively connecting said control means to said valve means in said power circuit branches for operating said valve means in response to the manipulation of said control means.

5. A multiple axle mechanism according to claim 4;
said valve means each including a solenoid operated valve;
a source of electrical potential;
said control means including an electrical switch having contacts connected to the solenoids of said solenoid operated valves and an armature connected to said source of electrical potential.

6. A multiple axle mechanism according to claim 1;
means for locking-out said differential drive mechanism;
means for operating said locking-out means;
means for preventing operation of said locking-out means except when said gear sets are in corresponding speed ratios; and
means for preventing shifting of said gear sets by said control means while said locking-out means is locking-out said differential drive mechanism.

7. A multiple axle mechanism as set forth in claim 1;
said second force means including a first power circuit connected to and acting on each gear set for shifting said gear sets between first and second speed ratios;
said first power circuit including a power source and two parallel branches connecting said power source to said gear sets, respectively;
a means for locking-out said differential drive mechanism;
power operated means for operating said locking-out means;
said first power circuit having a third branch connecting said power source to said power operated means;
a cut-off means in said third branch between said power source and said power operated means movable between open and closed positions for controlling the flow of power from said power source to said power operated means, said cut-off means having a power operator;
a second power circuit for actuating said power operator to move said cut-off means between open and closed positions;
a second operator-manipulated control means for said second power circuit movable between open and closed positions to open and close said second power circuit;
means in said second power circuit responsive to the speed ratio condition of said gear sets for holding open said second power circuit if said gear sets are not in corresponding speed ratios when said second control means is moved to closed position; and
means responsive to the flow of power in the third branch of said first power circuit for preventing operation of the first-named control means when said cut-off means of said second power circuit is in open position and power is flowing in said third branch.

8. A multiple axle mechanism, comprising:
a power input shaft;
differential means drivingly connected to said power input shaft;
a pair of axles, each axle having an axle driving means including a gear set having at least two speed ratios for drivingly connecting said differential means with said axle;
shifting means for shifting the gear sets independently of each other;
power operated actuating means respectively connected to said shifting means for each set for operating said shifting means for the respective gear sets independently of each other;
means placing each of said gear sets into the first of said speed ratios;
a power source supplying power to said actuating means, said actuating means each having means including a control terminal for controlling flow of power from said source to said actuating means; and
control means for a first and second speed ratio of each of said gear sets movable among at least three positions for selective engagement with said control terminals so that operation of said actuating means is responsive to the position of said control means, said control means being out of contact with said terminals in one position thereof so that both gear sets are maintained in said first of said speed ratios, said control means in a second position thereof being in contact with only one terminal to effect a shift of one gear set into a second speed ratio, said control means in the third position thereof being in contact with both control terminals to effect a shift of the other gear set into said second speed ratio while maintaining said one gear set in said second speed ratio.

9. A multiple axle mechanism, comprising:
a power input shaft;
differential means drivingly connected to said power input shaft;
a pair of axles, each axle having an axle driving means including a gear set having at least two speed ratios for drivingly connecting said differential means with said axle;
power operated actuating means connected to said gear sets for shifting the respective gear sets independently of each other;
means placing each of said gear sets in a first speed ratio;
a power source supplying power to said actuating means;
power flow control means between said power source and said actuating means for controlling the flow of power to said actuating means;
switching means connected to said power flow control means, said power flow control means including a first device for controlling said power flow so that one gear set is shifted and a second device for controlling said power flow so that the second gear set is shifted, said switching means being movable among three positions, said switching means in one position thereof maintaining said first and second devices in corresponding conditions so that both gear sets are maintained in corresponding ones of said speed ratios, said switching means in a second position thereof effecting operation of said first device so that one gear set is shifted into a second of said speed ratios while maintaining said second device in its original condition so that the other gear set is maintained in said first-mentioned speed ratio, said switching means in a third position thereof effecting operation of both said devices so that both gear sets are placed in said second of said speed ratios.

10. A multiple axle mechanism, comprising:
a power input shaft;
a first axle and axle driving means including a gear set having at least two speed ratio positions drivingly connecting said power input shaft with said first axle;
differential means drivingly connected to said power input shaft;
a second axle and axle driving means including a gear set having at least two speed ratio positions drivingly connecting said differential means to said second axle;

means normally biasing said gear sets into the first of said two speed ratio positions;

a pair of pressure fluid cylinders independently connected to the respective gear sets for urging same into said second of said speed ratio positions when pressure fluid is supplied to said cylinders;

a pair of pressure fluid circuits connected respectively to said pressure fluid cylinders for supplying pressure fluid to said cylinders, each of said circuits including a check valve oriented for being held in closed position by pressure fluid applied thereto in a direction for supplying said pressure fluid to said cylinders and means for supplying fluid pressure constantly thereto;

electrically operable means for selectively unseating said check valves; and manually operable means operable in one manner for actuating said electrically operable means to unseat one check valve to shift one of said gear sets into its second of said speed ratio positions independently of the other gear set and operable in another manner thereafter for actuating said electrically operable means to unseat the other check valve to shift the other gear set into its second of said speed ratio positions while maintaining said one gear set in its second of said speed ratio positions.

11. A multiple axle mechanism, comprising:
a power input shaft;
a first axle and axle driving means including a gear set having at least two speed ratio positions drivingly connecting said power input shaft with said first axle;
differential means drivingly connected to said power input shaft;
a second axle and axle driving means including a gear set having at least two speed ratio positions drivingly connecting said differential means to said second axle;
spring means normally biasing said gear sets into the first of said two speed ratio positions;
a pair of pressure fluid cylinders independently connected to the respective gear sets for urging same into the second of said speed ratio positions when pressure fluid is supplied to said cylinders;
a pair of pressure fluid circuits connected respectively to said pressure fluid cylinders for supplying pressure fluid to said cylinders;
each of said circuits including a check valve oriented for being held in closed position by pressure fluid applied thereto in a direction for supplying said pressure fluid to said cylinders and means for supplying fluid pressure constantly thereto;
electrically operable means for selectively unseating said check valves; and
a manually operable switch operable in one manner for actuating said electrically operable means to unseat one check valve to shift one of said gear sets into said second of said speed ratio positions independently of the other gear set and operable in another manner thereafter for actuating said electrically operable means to unseat the other check valve to shift the other gear set into its second of said speed ratio positions while maintaining said one gear set in its second of said speed ratio positions.

12. The mechanism defined in claim 11 including pressure fluid responsive means for locking-in said differential means, and means for energizing said pressure fluid responsive means only when a selected one of said gear sets is in said first of said speed ratio postions.

13. The mechanism define din claim 11 including a switch associated with one of said gear sets, said switch being in a power interrupting condition when said one gear set is in said first of said speed ratio positions and being in power-transmitting condition when said gear set is in said second of said speed ratio positions, and fluid pressure responsive means energizable only when said switch is in a power-transmitting condition for locking in said differential means.

14. A multiple axle mechanism comprising:
an input shaft having a central opening extending lengthwise thereof and opening through the rearward end thereof, said input shaft having axially spaced, substantially radially extending openings communicating with said central opening;
a differential drive mechanism mounted on said input shaft and having planetary gearing arranged around said input shaft in the vicinity of selected ones of said radially extending openings;
a first driven shaft driven by said differential drive mechanism from said input shaft, said first driven shaft being coaxial with said input shaft and having a central opening extending lengthwise thereof through the front end thereof, one of the shafts being piloted in the other with said central openings being in communication, said first driven shaft having substantially radially extending openings communicating with said central opening therein;
a second driven shaft and gears for driving same from said input shaft;
said gears being in the vicinity of selected ones of said radially extending openings in said input shaft;
a housing enclosing the rearward end of the input shaft, the frontward end of said first driven shaft, said differential drive mechanism and said gears, said housing having trough and conduit means therein extending from adjacent said gears to adjacent said radially extending openings in said first driven shaft and being in communication therewith whereby lubricant in said housing is thrown into said trough and conduit means, passes into and through said central openings and thence is directed toward said gears and said differential drive mechanism;
a first axle and two speed axle driving means driven by said second driven shaft; and
a second axle and two speed axle driving means driven by said first driving shaft.

15. A multiple axle mechanism, comprising:
a power input shaft;
differential means including planetary gearing means drivingly connecting said differential means to said power input shaft, said differential means including a first driven shaft coaxially arranged with said power input shaft with one of said shafts being piloted in the other and including also a second driven shaft and gears for driving same from said power input shaft;
means defining a first central opening in the rearward end of said power input shaft and means defining a communicating coaxial second central opening in the forward end of said first driven shaft;
trough and conduit means for receiving oil thrown centrifugally from one of said gears and conducting it to said second central opening;
a spider connected for rotation with said power input shaft and said drivingly connecting means including differential planetary gearing arranged on said spider;
means defining a passageway extending radially from said first central opening outwardly through said power input shaft for discharging oil adjacent said planetary gearing, whereby at high rotational speeds of said differential means oil will be centrifugally pumped from a source by said gears and through said central openings into said planetary gearing;
a first axle and axle driving means including a multispeed gear set drivingly connecting said second driven shaft with said first axle;
a second axle and axle driving means including a multispeed gear set drivingly connecting said first driven shaft to said second axle, and manually operable means operable in one manner for selecting the driving ratio in one of said multi-speed gear sets independently of the driving ratio in the other gear set and operable in another manner thereafter to shift the other gear set to the same driving ratio previously established in said one gear set.

References Cited in the file of this patent

UNITED STATES PATENTS

| | | |
|---|---|---|
| 2,064,262 | Keese | Dec. 15, 1936 |
| 2,213,981 | Freeman | Sept. 10, 1940 |
| 2,462,779 | Russell | Feb. 22, 1949 |
| 2,603,108 | Carlson | July 15, 1952 |
| 2,618,359 | Alden | Nov. 18, 1952 |
| 2,754,692 | Russell | July 17, 1956 |
| 2,842,226 | Liebel | July 8, 1958 |
| 2,860,726 | Thomas et al. | Nov. 18, 1958 |
| 2,971,393 | Bartholomew | Feb. 14, 1961 |
| 2,981,126 | Kelley | Apr. 25, 1961 |